Jan. 13, 1970     A. LOSTANLEN     3,489,106

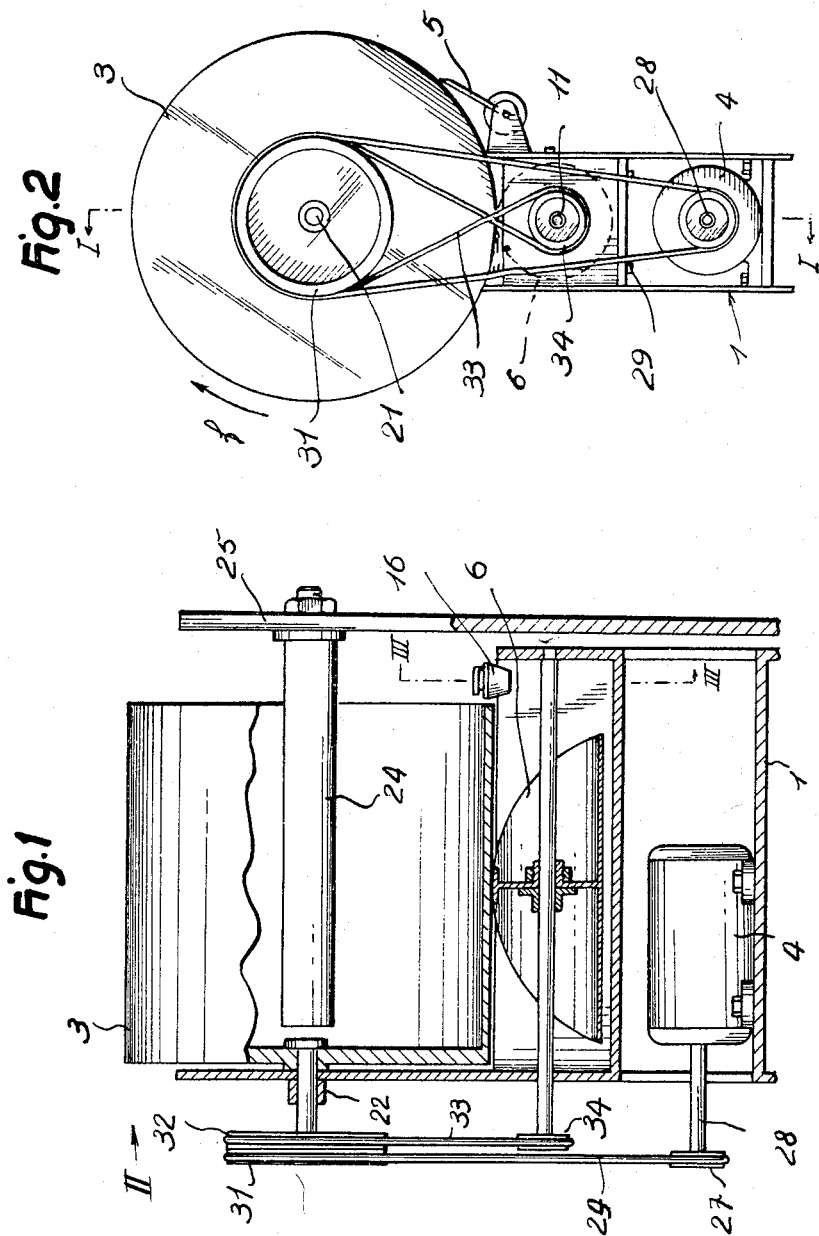

PANCAKE MAKING MACHINE

Filed Jan. 16, 1968     2 Sheets-Sheet 2

United States Patent Office 3,489,106
Patented Jan. 13, 1970

3,489,106
PANCAKE MAKING MACHINE
Auguste Lostanlen, 46 Rue A. Buisson, La Garenne-Colombes, Hauts-de-Seine, France
Filed Jan. 16, 1968, Ser. No. 698,262
Int. Cl. A21f 5/00
U.S. Cl. 107—60　　　　　　　　　　　4 Claims

ABSTRACT OF THE DISCLOSURE

The invention has for its object a pancake making machine comprising a cylindrical drum mounted to rotate about a horizontal axis and having at least one pick-up portion in the shape of a pancake rolled on the cylindrical surface of the drum. The drum is positioned so as to contact the level of batter contained in a pan arranged underneath and heating means are provided for cooking the doses of batter retained by the aforesaid pick-up portions of the drum in order to make pancakes.

BRIEF SUMMARY

The present invention relates to pancake making and particularly to a pancake making machine.

An object of the invention is to enable the manufacture of circular pancakes practically automatically, with great efficiency and economy and capable of mass production.

The pancake making machine according to the invention comprises a cylindrical drum mounted to rotate about a horizontal axis and having at least one pick-up portion in the shape of a circular pancake rolled on the cylindrical geometrical surface of said drum, a pan open at the top and positioned at the bottom of said drum so that said pick-up portion passes through the top part of said pan in its rotational path of travel and picks up a dose of batter of uniform thickness, means for rotating said drum uninterruptedly at a constant speed, and heating means for heating said dose of batter of uniform thickness to cook a pancake.

DESCRIPTION OF DRAWINGS

Referring to the drawings:

FIG. 1 shows in vertical section made on line I—I of FIG. 2 a first embodiment of a pancake making machine according to the invention, FIG. 2 is a side view corresponding to FIG. 1 and observed in the direction of arrow II.

DETAILED DESCRIPTION

Figure 3:
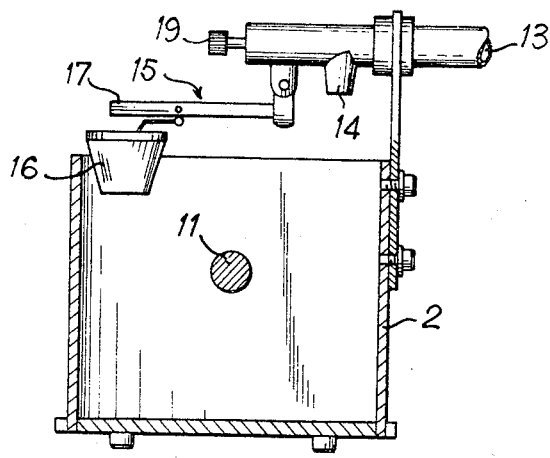
FIG. 3 shows on a larger scale, a detail of FIG. 1 made in section on line III—III.

The pancake making machine shown in FIGS. 1 and 2 comprises a frame 1 in which are mounted a pan 2 containing batter 10 suitable for making pancakes, a horizontal rotary drum 3 for cooking the pancakes, a further horizontal rotary drum 6 for transferring successive quantities or doses of batter from pan 2 to cooking drum 3, an electric motor 4 for driving both drums, and a scraping blade 5 for detaching the pancakes from drum 3.

In the embodiment represented, the batter pan 2 is rectangular and the shaft 11 of the transfer drum 6 is journalled in the end walls of pan 2.

The batter is fed to pan 2 through an automatic feeding device which maintains a constant level in the pan. The feeding device comprises a supply pipe 13 (FIG. 3), a spout 14 through which the batter is poured from the pipe 13 into pan 2 and means for interrupting communication between pipe 13 and spout 14, the latter means being controlled by a regulating device designated as at 15 of any suitable conventional type and comprising a float 16 which rests on the upper surface of the batter in pan 2 and a lever 17 which carries said float and which is connected by means not shown to a valve adapted to shut off the communication between pipe 13 and spout 14. A knurled knob 19 makes it possible to shut off completely the supply of batter to the spout 14.

The horizontal cooking drum 3 is mounted in overhanging position by one of its ends on a shaft 21 which is journalled in a bearing 22 secured to the frame 1.

Within the horizontal cooking drum 3 is arranged a heating element 24 of any conventional suitable type which extends into said drum through the other open end of it remote from the bearing 22, said heating element being secured to a support 25 itself carried by the frame 1.

The horizontal cooking drum 3 is rotatably driven from the electric motor 4 through a transmission which comprises a sheave 27 secured to the shaft 28 of the motor, a belt 29 which flexes over the sheave 27 and over a further sheave 31 secured to the shaft 21 of the drum.

The transfer drum 6 is rotatably driven from the shaft 21 of the cooking drum through a transmission which comprises a sheave 32 also secured to shaft 21 and which may be made of one piece together with sheave 31, a crossed belt 33 which flexes over sheave 32 and over a further sheave 34 secured to the shaft 11 of the transfer drum 6. The ratio of the diameters of the various sheaves are such that the cooking drum 3 and the transfer drum 6 rotate at the same peripheral speed in unison.

The transfer drum 6 is substantially tangent to the lower part of the cooking drum 3, the gap between both drums being substantially equal to the thickness of the pancake to be made.

In the embodiment represented the development of the cylindrical surface of the transfer drum 6 is a circle having the dimension of the pancakes to be obtained.

The operation of the machine is as follows:

The pan 2 being supplied with batter, the heating element 24 being in operation and the electric motor 4 rotating, the transfer drum 6 which dips into the batter lays against the cylindrical surface of the cooking drum 3 which rotates exactly at the same peripheral speed as the transfer drum, circular doses of batter which are being cooked on drum 3 on the portion of the latter which is first moving upwardly (direction of arrow f) then downwardly until the moment when they are detached by the scraping blade 5. The rotational speed of the cooking drum 3 and the heating energy are so adjusted that each successive pancake is suitably cooked upon reaching the detaching blade 5.

Figure 4:
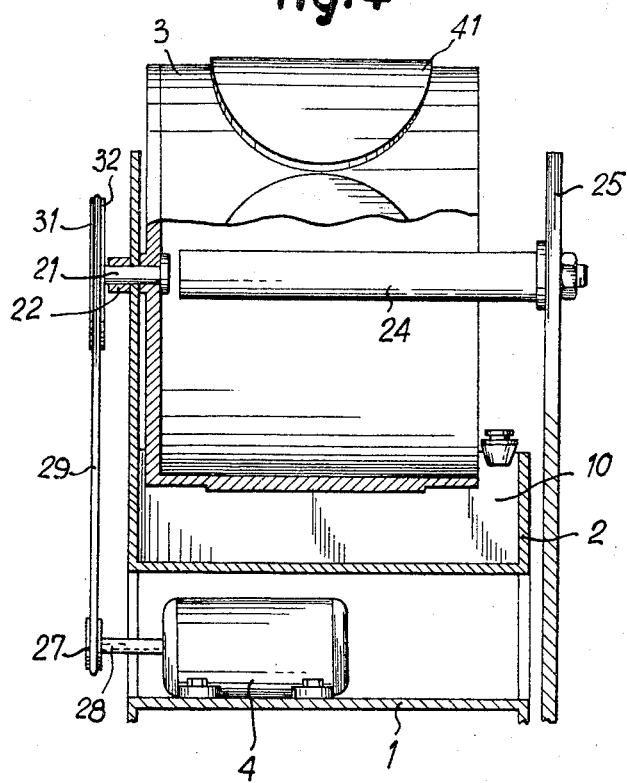
FIG. 4 shows also in vertical section another embodiment of a pancake making machine according to the invention.

FIG. 4 shows another embodiment which is derived from the machine of FIG. 1 with the difference that the transfer drum 6 is omitted and the machine, therefore, has a single drum 3 the cylindrical surface of which is provided with circular elevated portions 41 corresponding to the size of the pancakes to be obtained, the drum being so positioned with respect to the pan 2 that the surfaces of the elevated circular portions 41 contact the batter 10 in the pan 2 in their rotational path of travel. The other parts of the machine, however, are similar to those already described with reference to the embodiment of FIGS. 1 to 3.

The operation of the machine of FIG. 4 is also similar to the operation of the machine of FIGS. 1 to 3, with the difference that the doses of batter are picked up directly by the elevated circular portions 41 of the single drum and directly cooked on their ascending and then descending travel down to the detaching blade 5 instead of being picked up by the transfer drum 6 and deposited upon the cooking drum 3 as in the embodiment first described.

I claim:
1. Apparatus for the production of pancakes comprising:
   a cylindrical drum having at least a first raised area on its outer surface, said raised area defining the shape of a pancake to be produced;
   a horizontal axle rotatably supporting said drum;
   a pan having an opening positioned adjacent said drum, said pan holding the batter, said drum raised surface area contacting the batter as the drum rotates;
   means for driving said drum about said axle; and
   means for heating the batter which adheres to said drum raised surface area.
2. The machine according to claim 1, further comprising feeding means for supplying batter to said pan, and regulating means for controlling said feeding means to maintain the batter level constant within said pan.
3. The machine according to claim 1, wherein said heating means are arranged within said drum.
4. The apparatus of claim 3 further comprising:
   scraping blade means fixedly positioned adjacent said drum and, in the direction of rotation thereof, ahead of said pan whereby said drum raised surface portions will be scraped clean prior to being passed into the batter in said pan.

References Cited
UNITED STATES PATENTS 1,399,149  12/1921  Nuubson _____ 107—60

EDWARD L. ROBERTS, Primary Examiner